(12) United States Patent  
Fairs et al.

(10) Patent No.: US 7,802,265 B2  
(45) Date of Patent: *Sep. 21, 2010

(54) COMPUTER INTERFACE SYSTEM USING MULTIPLE INDEPENDENT GRAPHICAL DATA INPUT DEVICES

(75) Inventors: James R. Fairs, Naperville, IL (US); Vlad Zarney, Calabasas, CA (US); Daniel E. Schaaf, Michigan City, IN (US)

(73) Assignee: IMI Innovations, Inc., Naperville, IL (US)

( * ) Notice: Subject to any disclaimer, the term of this patent is extended or adjusted under 35 U.S.C. 154(b) by 1070 days.

This patent is subject to a terminal disclaimer.

(21) Appl. No.: 11/001,328

(22) Filed: Nov. 30, 2004

(65) Prior Publication Data

US 2006/0066571 A1    Mar. 30, 2006

Related U.S. Application Data

(60) Provisional application No. 60/553,205, filed on Mar. 15, 2004.

(51) Int. Cl.
*G06F 13/00* (2006.01)
*G06F 3/00* (2006.01)
*G06F 3/048* (2006.01)
*G06F 9/45* (2006.01)

(52) U.S. Cl. .............. 719/321; 719/327; 719/328; 715/762; 715/763; 715/764; 715/765; 715/854; 715/855; 715/856; 710/5; 717/139

(58) Field of Classification Search .......... 719/321, 719/327, 328; 345/156, 672; 715/762–765, 715/854–856; 710/5; 717/139
See application file for complete search history.

(56) References Cited

U.S. PATENT DOCUMENTS

| | | | | |
|---|---|---|---|---|
| 6,262,730 | B1* | 7/2001 | Horvitz et al. | 715/707 |
| 6,643,721 | B1* | 11/2003 | Sun | 710/62 |
| 6,731,307 | B1* | 5/2004 | Strubbe et al. | 715/727 |
| 6,938,221 | B2* | 8/2005 | Nguyen | 715/863 |

\* cited by examiner

*Primary Examiner*—Van H Nguyen
*Assistant Examiner*—Phuong H Hoang
(74) *Attorney, Agent, or Firm*—Fernandez & Associates, LLP (57) ABSTRACT

Improved computer interface system using multiple independent graphical data input devices is disclosed. Multiple independent graphical data input devices allow users to input data independently from multiple independent graphical data input devices to operating system. Graphical input device driver decodes input from multiple independent graphical input devices. Operating system interface software interprets data from graphical input device driver. Operating system software further generates and controls multiple cursors or control points. Graphical input device aware program obtains and interprets graphical input devices event message, and controls graphical input device aware objects.

12 Claims, 7 Drawing Sheets

COMPUTER INTERFACE SYSTEM USING MULTIPLE INDEPENDENT GRAPHICAL DATA INPUT DEVICES

CROSS REFERENCE TO RELATED APPLICATIONS

This application claims the benefit of U.S. Provisional Application No. 60/553,205, filed Mar. 15, 2004, by James R. Fairs, Daniel E. Schaaf, entitled "MULTIPLE INDEPENDENT FULLY FUNCTIONAL GRAPHICAL INPUT DEVICES CONTROLLING MULTIPLE INDEPENDENT FULLY FUNCTIONAL CURSORS AND CONTROL POINTS".

BACKGROUND

1. Field

The invention relates to data input methods and systems supporting multiple independent data input devices, particularly to multiple independent fully functional graphical input devices controlling multiple independent fully functional cursors and control points.

2. Related Art

Conventional data input methods employ single input device and single cursor or control point on operating system interface. Despite the rapid advances in computer processing power and new software and hardware technology, one aspect of data input has not changed appreciably: a single graphical input device, such as mouse, tracking ball, pad, or pen, is utilized for navigation and implementation. The conventional data input method is limited to the extent that it does not support multiple independent cursors for multiple independent input devices.

Prior techniques for multiple data input devices typically use complex and unfamiliar devices instead of standard mouse. Typically the driver for the second data input device is not installed on system level, and thus the graphical input device is not applied globally, or the systems incorporate insufficient and incomplete interface functionality for the user.

Accordingly, there is a need for improved data input methods and systems allowing users better and faster control of the graphical input interface. Novel methods and systems supporting multiple input devices are described herein.

SUMMARY

An improved computer interface system supporting multiple independent graphical input devices is disclosed. The improved computer interface system includes multiple independent graphical input devices, graphical input devices driver, operating system interface software, graphical input device aware program, graphical input device aware objects and multiple independent graphical input devices cursors and control points.

A computer-implemented method for supporting multiple graphical input devices, wherein the novel method generates multiple graphical input devices cursors and control points, decodes raw input messages from graphical input devices and generates graphical input devices event message, and converts it to data usable for computer operating system or application programs. Additionally, the novel method presents graphical input device aware program and graphical input device aware objects for allowing user to exploit the functions of the independent graphical input devices.

BRIEF DESCRIPTION OF DRAWINGS

The accompanying drawings which are incorporated in and form a part of this specification, illustrate embodiments of the invention and together with the description, serve to explain the principles of the invention.

DETAILED DESCRIPTION

This specification describes an improved computer interface system using multiple independent data input devices. The system allows implementation of multiple cursors or control points under the control of multiple independent data input devices. Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, the invention may be practiced without these specific details.

Figure 1:
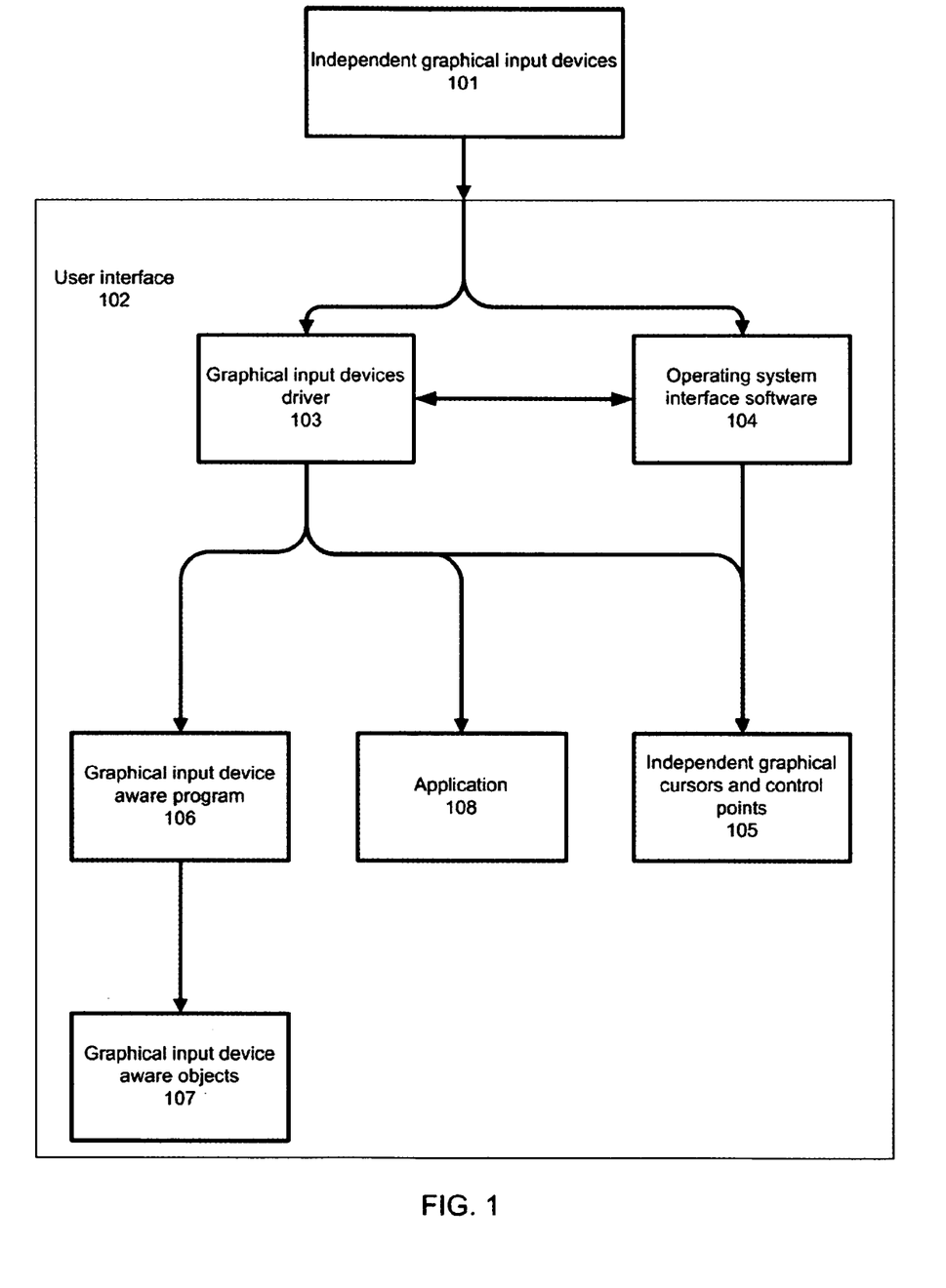
FIG. 1 is a diagrammatic illustration of the improved computer interface system using multiple independent data input devices according to one exemplary implementation of the present invention.

FIG. 1 is a diagrammatic illustration of the improved computer interface system using multiple independent graphical data input devices 101 according to one exemplary implementation of the present invention. As understood herein, the term "graphical input devices" is interpreted and construed broadly to mean any input device or any input functionality, software, hardware, or firmware, which generates continuous or discrete input signal based on human manipulation. Examples of such graphical input devices include, but are not limited to, standard mice, modified mice, touch screens, drawing pads, game controllers, touch pads, keyboards, voice driven input systems, as well as various firmware, etc. Graphical input devices 101 may be connected to the user interface 102 via serial port, USB port, or PS/2 port, or other connection types. Graphical input devices 101 may be connected to the user interface via wire, IR, wireless, or remotely, such as over the internet, and other means. Examples of user interface 102 include, but are not limited to, computer interface, game player interface, ATM interface, various embedded device interfaces such as cell phone interface, personal digital assistants interface, global positioning system interface, etc. User interface 102 accepts as raw input message from graphical input devices based on human manipulation.

Raw input message is then processed by either graphical input devices driver 103 or operating system software 104. Raw input message generally includes positions of the multiple independent input devices 101, movements of the multiple independent input devices 101, and states of other multiple independent input devices elements, such as buttons. Graphical input devices driver 103 takes raw input message and converts it to X/Y coordinate data of the multiple graphical input devices' movements on a plane and states of other device elements. Operating system software 104 also takes raw input message directly from multiple independent input devices 101. Operating system software 104 interacts with graphical input devices driver 103 by sending request to graphical input devices driver 103 for graphical input devices event message and receiving graphical input devices event message from graphical input devices driver 103. Preferably, graphical input devices driver 103 comprises standard system graphical input devices driver, and/or specialized/modified graphical input devices driver. Examples of graphical input devices driver 103 include, but are not limited to, system mouse driver, modified mouse driver, touch screen driver, drawing pad driver, game controller driver, touch pad driver, voice driven input system driver, as well as various firmware drivers, etc.

Independent graphical cursors and control points 105 are generated by operating system software 104 together with graphical input devices driver 103, and are fully under control of movements and states of independent graphical input devices 101. As understood herein, the term "graphical cursors and control points" is interpreted and construed broadly to mean any indicator or marker comprising a movable point on visual display. Examples of graphical cursors and control points include, but are not limited to, cursors, control points, or functionalities embedded within an application, wherein such graphical cursors and control points could be either visible, or could be embedded but not rendered in visible forms. Movements of, and changes on, other states of the graphical cursors and control points under the control of graphical input devices allow user to point to commands or screen positions.

Graphical input devices driver 103 sends graphical input devices event message to application 108 or graphical input device aware program 106. As understood herein, the term "application" is interpreted and construed broadly to mean any application software provided by operating system or installed on operating system, or any application connected to operating system, or any application on the internet or intranet. Graphical input device aware program 106 is designed for users to exploit the functions of the independent graphical input devices 101. Graphical input device aware program 106 interprets the graphical input devices event message from graphical input devices driver 103 and controls graphical input device aware objects 107. Graphical input device aware objects 107 are designed to be aware of independent graphical input devices. Graphical input device aware objects 107 might be designed to be under control of individual independent graphical input devices 101, or a combination of a number of independent graphical input devices 101, or all of independent graphical input devices 101. Preferably, for example, first or first set of graphical input device aware objects 107 are under control of first graphical input device 101, second or second set of graphical input device aware objects 107 are under control of second graphical input device 101, and so on. Optionally, all graphical input device aware objects 107 might be configured to be under control of first graphical input device 101, or second graphical input device 101, or other available graphical input devices 101, or all available graphical input devices 101. As understood herein, the term "graphical input device aware objects" is interpreted and construed broadly to mean any input control objects such as graphical input devices numeric input boxes, graphical input devices scroll bars, graphical input devices menus, other graphical input device aware objects, and numerous spoken voice input device objects.

Figure 2:
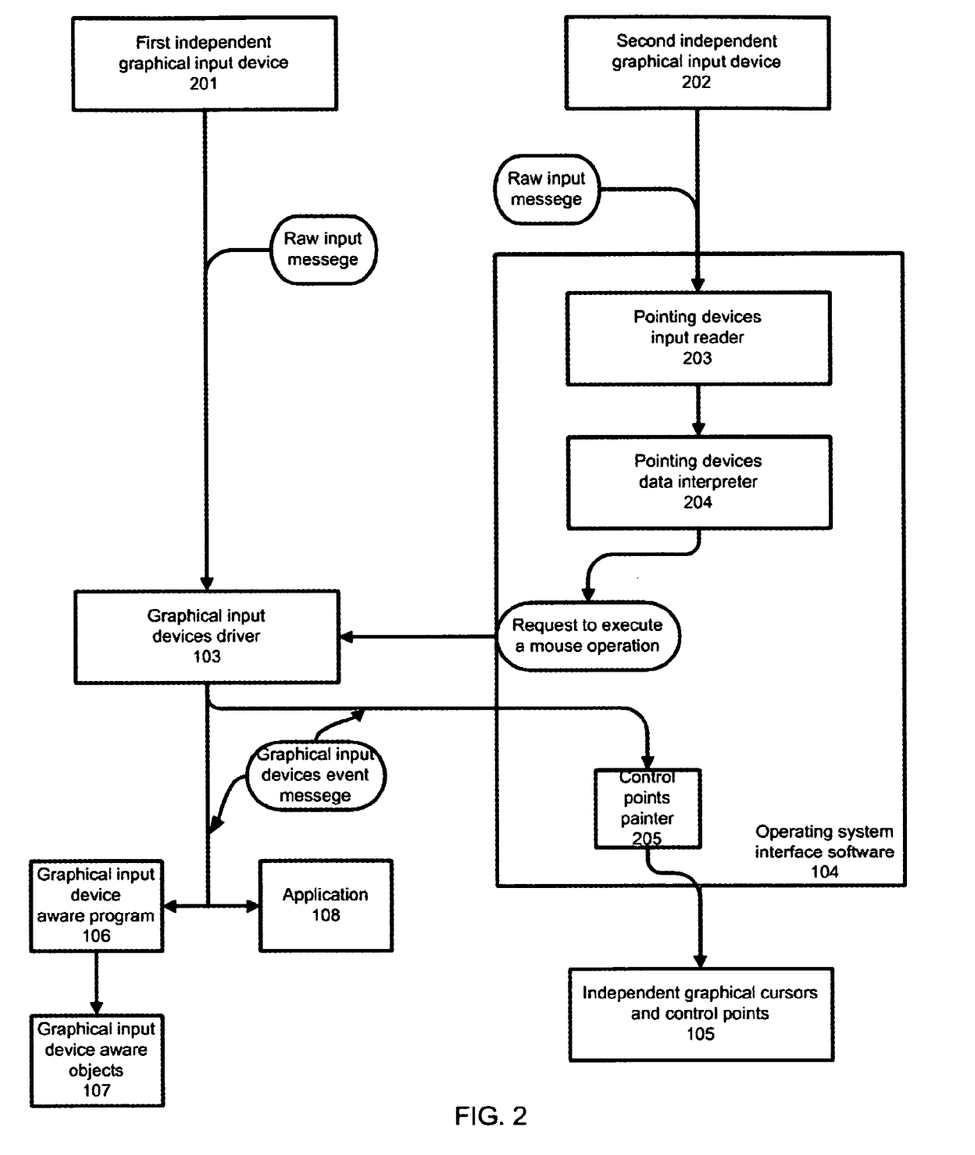
FIG. 2 is a diagrammatic illustration of the processing flow of the system according to one exemplary implementation of the present invention.

FIG. 2 is a diagrammatic illustration of the processing flow of the system according to one embodiment of the implementation of the present invention as shown in FIG. 1. According to this embodiment, an interface system comprising two graphical input devices is illustrated in the figure herein. However, the system and method described for the invention is not limited to a system with two graphical input devices. On the contrary, the invention is intended to cover an interface system utilizing a plurality of graphical input devices.

In FIG. 2, raw input message is sent from first independent graphical input device 201 to graphical input devices driver 103. In the illustrated embodiment, raw input message is also sent from second independent graphical input device 202 to operating system interface 104. In the illustrated embodiment, operating system interface software 104 comprises pointing devices input reader 203, pointing devices data interpreter 204, and control point painter 205. Pointing devices input reader 203 reads in raw input message from second independent graphical input device 202 and sends it to pointing devices data interpreter 204. Examples of pointing devices input reader include, but are not limited to, serial port input reader, USB port reader, PS/2 port reader and/or other types of port reader.

Raw input message is read in by pointing devices input reader 203 and is further processed by pointing devices data interpreter 204. Pointing devices data interpreter 204 first translates data from pointing devices input reader 203 into uniformly formatted data. Pointing devices data interpreter 204 further detects the types of actions generated by second independent graphical input device 202, for example, graphical input devices movement, graphical input devices button state change, or other graphical input devices element state change. Pointing devices data interpreter 204 further translates these input data in order to generate graphical input devices event message.

To programmatically generate graphical input devices event message, pointing devices data interpreter 204 sends a request to execute a mouse operation to graphical input devices driver 103. Graphical input devices driver 103 reads in the data presented by pointing devices data interpreter 204 and converts it to X/Y coordinate data of the multiple graphical input devices movements on a plane and states of other device elements. Upon the request by pointing devices data interpreter 204 to execute a mouse operation, graphical input devices driver 103 sends graphical input devices event message back to operating system interface software 104. Control points painter 205 accepts graphical input devices event message and consequentially generates independent graphical cursors and control points 105.

As illustrated in the embodiment in FIG. 2, graphical input devices event message generated by graphical input devices driver 103 is also received by either graphical input device aware program 106 or application 108. Upon graphical input devices event message, graphical input device aware program 106 controls graphical input device aware objects 107.

Figure 3:
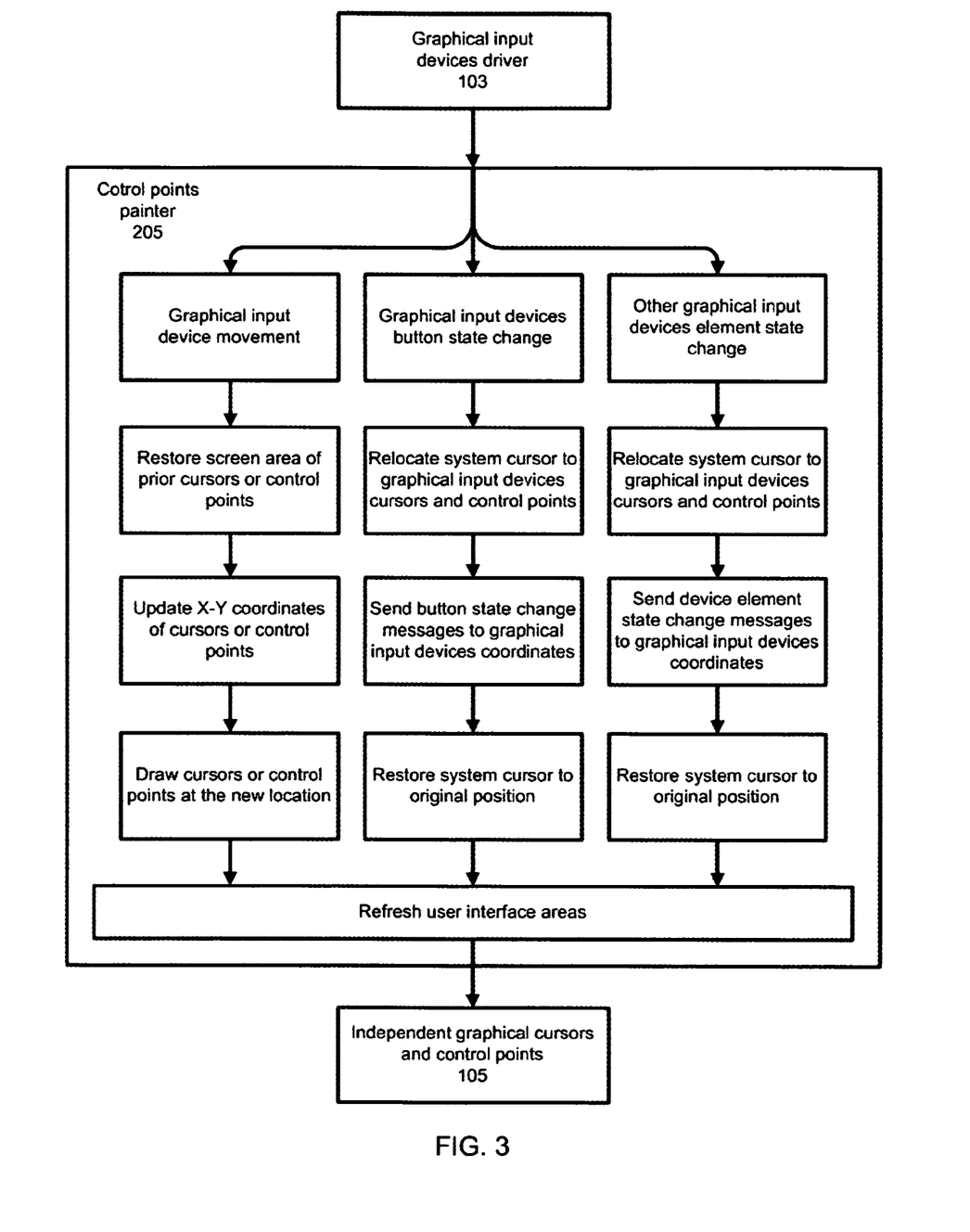
FIG. 3 is a diagrammatic illustration of the processing flow of generating graphical input devices cursors and control points according to one exemplary implementation of the present invention.

FIG. 3 is a diagrammatic illustration of the processing flow of generating graphical input devices cursors and control points according to the embodiment of the present invention as shown in FIG. 2. As illustrated in the implementation in FIG. 3, graphical input devices event message is generated by graphical input devices driver 103 and sent to control points painter 205. Graphical input devices event message comprises graphical input devices movements, graphical input devices button state change, and/or other graphical input devices element state change.

Upon graphical input devices event message, control points painter 205 detects graphical input devices movements. Control points painter 205 restores screen area of prior graphical input devices cursors and control points, updates X-Y coordinates of graphical input devices, and consequentially draws graphical input devices cursors and control points at the new location. Upon graphical input devices event message, control points painter 205 detects graphical input devices button state change. Control points painter 205 relocates system cursor to graphical input devices cursors and control points via application 108 or graphical input device aware program 106. Control points painter 205 sends button state change messages to graphical input devices coordinates via application 108 or graphical input device aware program 106. Upon graphical input devices event message, control points painter 205 detects other graphical input devices element state change. Control points painter 205 relocates system cursor to graphical input devices cursors and control points via application 108 or graphical input device aware program 106. Control points painter 205 sends other graphical input devices element state change messages to graphical input devices coordinates via application 108 or graphical input device aware program 106. At the end of the processes illustrated in the embodiment in FIG. 3, control points painter 205 refreshes user interface area and consequentially regenerates independent graphical input devices cursors and control points 105.

Figure 4:
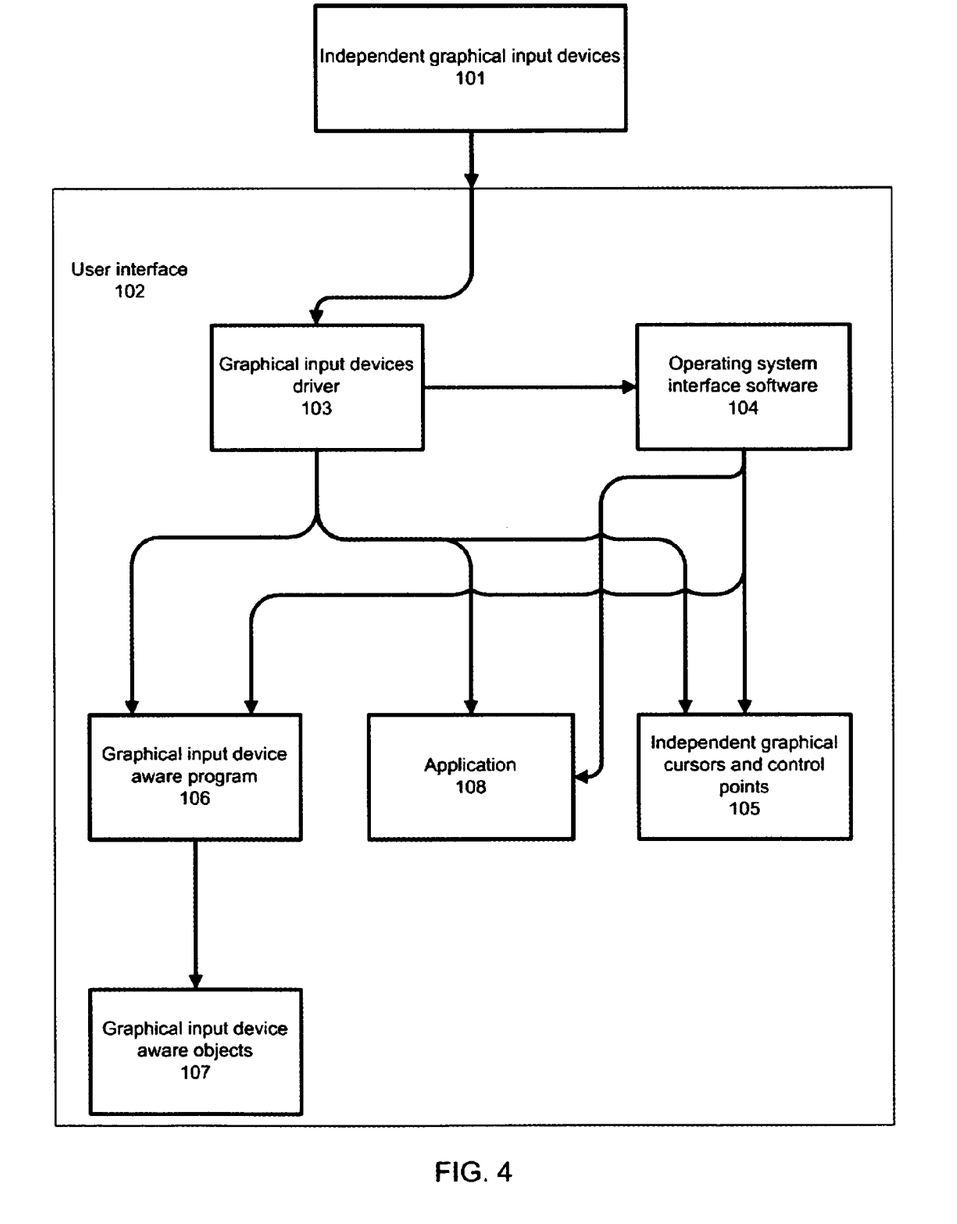
FIG. 4 is a diagrammatic illustration of the improved computer interface system using multiple independent data input devices points according to second exemplary implementation of the present invention.

FIG. 4 is a diagrammatic illustration of the improved computer interface system using multiple independent graphical data input devices 101 according to second implementation of the present invention. Raw input message is processed by graphical input devices driver 103. Graphical input devices driver 103 takes raw input message and converts it to X/Y coordinate data of the multiple graphical input devices movements on a plane and states of other device elements. Graphical input devices driver 103 recognizes the input message, determines which independent input device 101 is attempting to access the operating system and generating the input message, and separates input message according to different independent input device 101 sources. If raw input message is generated by first or first set of independent graphical input devices, graphical input devices driver 103 sends graphical input devices event message to graphical input device aware program 106 and application 108. Graphical input device aware program 106 interprets the graphical input devices event message from graphical input devices driver 103 and controls graphical input device aware objects 107. Independent graphical cursors and control points 105 are generated by graphical input devices driver 103, and are fully under control of movements and states of first or first set of independent graphical input devices 101.

If raw input message is generated by second or second set of independent graphical input devices, or other independent graphical input devices, graphical input devices driver 103 passes raw input message and sends it to operating system software 104. Operating system software 104 takes raw input message from graphical input devices driver 103. Operating system software 104 takes raw input message and converts it to X/Y coordinate data of the multiple graphical input devices movements on a plane and states of other device elements. Operating system software 104 sends graphical input devices event message to graphical input device aware program 106 and application 108. Graphical input device aware program 106 interprets the graphical input devices event message from operating system software 104 and controls graphical input device aware objects 107. Independent graphical cursors and control points 105 is generated by operating system software 104 and is fully under control of movements and states of second or second set of independent graphical input devices 101.

Figure 5:
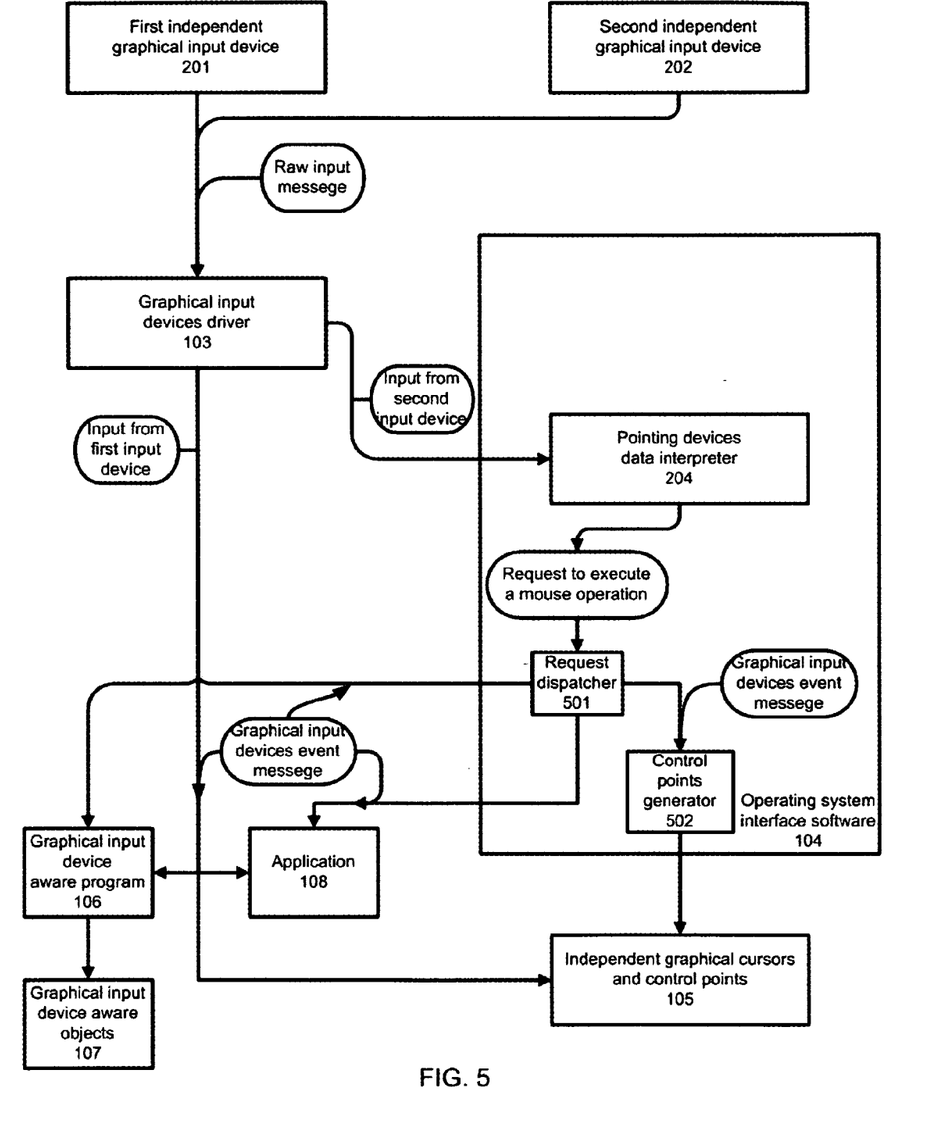
FIG. 5 is a diagrammatic illustration of the processing flow of the system according to second exemplary implementation of the present invention.

FIG. 5 is a diagrammatic illustration of the processing flow of the system according to one embodiment of the implementation of the present invention as shown in FIG. 4. According to this embodiment, an interface system comprising two graphical input devices is illustrated in the figure herein. However, the system and method described for the invention is not limited to a system with two graphical input devices. On the contrary, the invention is intended to cover an interface system utilizing a plurality of graphical input devices.

In FIG. 5, raw input message is sent from the first independent graphical input device 201 to graphical input devices driver 103. Graphical input devices driver 103 independently generates first independent graphical cursor and control point corresponding to first independent graphical input device. Graphical input devices driver 103 generates graphical input devices event message and sends graphical input devices event message to either graphical input device aware program 106 or application 108. Upon graphical input devices event message, graphical input device aware program 106 controls graphical input device aware objects 107.

In the illustrated embodiment, raw input message is also sent from the second independent graphical input device 202 to graphical input devices driver 103. Graphical input devices driver 103 reads in raw input message from the second independent graphical input device 202, and passes raw input message from the second independent graphical input device 202 to operating system software 104. Raw input message from the second independent graphical input device 202 is further processed by operating system interface software 104. In the illustrated embodiment, operating system interface software 104 comprises pointing devices data interpreter 204, control points generator 502, and request dispatcher 501. Pointing devices data interpreter 204 first translates data from graphical input devices driver 103 into uniformly formatted data. Pointing devices data interpreter 204 further detects the types of actions generated by second independent graphical input device 202, for example, graphical input devices movement, graphical input devices button state change, or other graphical input devices element state change. Pointing devices data interpreter 204 further translates these input data in order to generate graphical input devices event message.

To programmatically generate graphical input devices event message, pointing devices data interpreter 204 sends a request to execute a mouse operation to request dispatcher 501. Request dispatcher 501 generates graphical input devices event message and sends it to either graphical input device aware program 106 or application 108. Upon graphical input devices event message, graphical input device aware program 106 controls graphical input device aware objects 107. Request dispatcher 501 also sends graphical input devices event message to control points generator 502. Control points generator 502 accepts graphical input devices event message and consequentially generates independent graphical cursors and control points 105.

Figure 6:
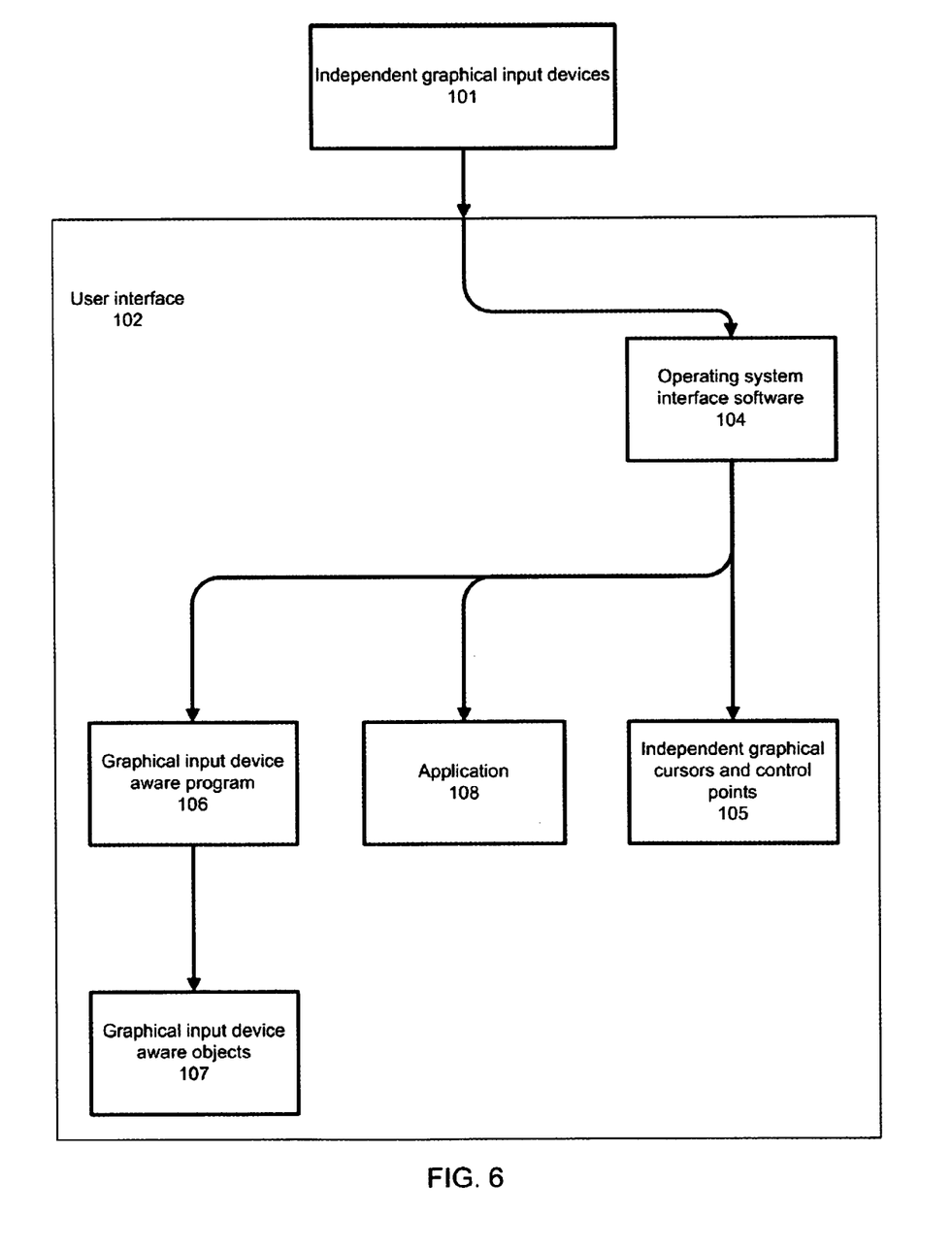
FIG. 6 is a diagrammatic illustration of the improved computer interface system using multiple independent data input devices according to third exemplary implementation of the present invention.

FIG. 6 is a diagrammatic illustration of the improved computer interface system using multiple independent graphical data input devices 101 according to third implementation of the present invention. Raw input message is processed by operating system software 104. Operating system software 104 takes raw input message and converts it to X/Y coordinate data of the multiple graphical input devices movements on a plane and states of other device elements. Operating system software 104 recognizes the input message, determines which independent input device 101 is attempting to access the operating system and generating the input message, and separates input messages according to different independent input device 101 sources. Independent graphical cursors and control points 105 are further generated by operating system software 104, and are fully under control of movements and states of independent graphical input devices 101. Operating system software 104 programmatically generates graphical input devices event message and sends it to graphical input device aware program 106 or application 108. Graphical input device aware program 106 interprets the graphical input devices event message from operating system software 104 and controls graphical input device aware objects 107.

Figure 7:
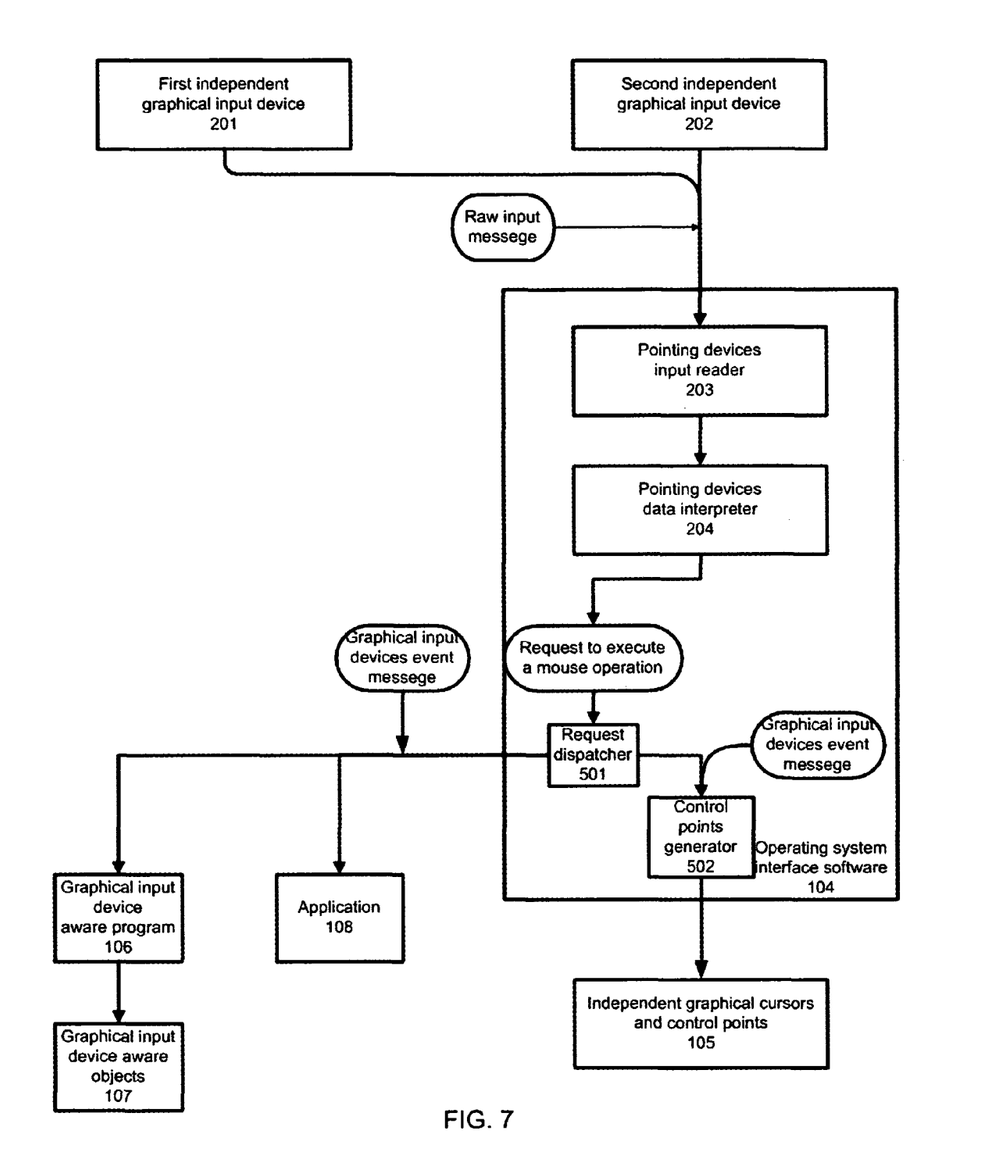
FIG. 7 is a diagrammatic illustration of the processing flow of the system according to third exemplary implementation of the present invention.

FIG. 7 is a diagrammatic illustration of the processing flow of the system according to one embodiment of the implementation of the present invention as shown in FIG. 6. According to this embodiment, an interface system comprising two graphical input devices is illustrated in the figure herein. However, the system and method described for the invention are not limited to a system with two graphical input devices. On the contrary, the invention is intended to cover an interface system utilizing a plurality of graphical input devices.

In FIG. 7, raw input message is sent, independently, from first independent graphical input device 201 and second independent graphical input device 202 to operating system interface software 104. In the illustrated embodiment, operating system interface software 104 comprises pointing devices input reader 203, pointing devices data interpreter 204, request dispatcher 501, and control points generator 502. Pointing devices input reader 203 reads in raw input message from first independent graphical input device 201 and second independent graphical input device 202 and sends it to pointing devices data interpreter 204. Examples of pointing devices input reader include, but not limited to, serial port input reader, USB port reader, PS/2 port reader and/or other types of port reader.

Raw input message is read in by pointing devices input reader 203 and is further processed by pointing devices data interpreter 204. Pointing devices data interpreter 204 first translates data from pointing devices input reader 203 into uniformly formatted data. Pointing devices data interpreter 204 further detects the types of actions generated by first independent graphical input device 201 and second independent graphical input device 202, for example, graphical input devices movement, graphical input devices button state change, or other graphical input devices element state change. Pointing devices data interpreter 204 translates these input data in order to generate graphical input devices event message. Pointing devices data interpreter 204 also recognizes the input message, determines which independent input device is attempting to access the operating system and generating the input message, and separates input message according to different independent input device sources. Pointing devices data interpreter 204 further converts the separated input message to different sets of X/Y coordinate data of the multiple graphical input devices movements on a plane and different sets of states of other device elements according to different independent graphical input device responsible to generating the separated input message.

To programmatically generate graphical input devices event message, pointing devices data interpreter 204 sends a request to execute a mouse operation to request dispatcher 501. Request dispatcher 501 generates graphical input devices event message, according to input from different independent graphical input devices, and sends it to either graphical input device aware program 106 or application 108. Upon graphical input devices event message, graphical input device aware program 106 controls graphical input device aware objects 107. Request dispatcher 501 also sends graphical input devices event message to control points generator 502. Control points generator 502 accepts graphical input devices event message, according to input from different independent graphical input devices, and consequentially generates two independent sets of graphical cursors and control points 105.

Preferably, in embodiments illustrated in FIG. 7, graphical input devices event message from first or first set of independent graphical input device 201 is sent to application 108. And graphical input devices event message from second or second set of independent graphical input device 202 is sent, specifically, to graphical input device aware program 106. Optionally, graphical input devices event message from both independent graphical input devices could be sent to application 108 only, or graphical input device aware program 106 only, or both application 108 and graphical input device aware program 106.

Forgoing descriptions of specific embodiments of the invention have been presented for purposes of illustration and description. They are not intended to be exhaustive or to limit the invention to the precise forms disclosed. Modifications and variations are possible in light of the above teaching. Various novel embodiments to present endorsement scheme include, for example: computer system implementing described system and method through a combination of hardware and software for allowing user better and faster control of the graphical input interface wherein multiple independent graphical input devices are integrated in the computer system, e.g. a two-mouse computer or a two-pad laptop; software implementing described system and method allowing user complex real-time data entry to be recorded as a two-handed model by recording data generated by movements of two graphical input devices, wherein one graphical input device manipulating the X-coordinates and the other manipulating the Y-coordinates; software implementing described system and method allowing user to navigate the interface using one graphical input device and to implement using another graphical input device; software implementing described system and method allowing user to navigate through multiple-screen environment; software implementing described system and method allowing each graphical input device or single graphical input device to be attached to specific functionalities within an application; two-handed media mixing console implementing described system and method; home theater system implementing described system and method allowing user to navigate among HDTV setting, DVD player and other setting; stock trading software implementing described system and method allowing user faster speed in navigation and data access; computer game system allowing user entirely new dimensions with entirely new potentials, e.g. a war game allowing user control army movement using one graphical input device, and create diversion using another graphical input device; or other numerous user interface systems used in residential, business, educational, entertainment, military, media, or other working system context wherein multiple graphical input devices is implemented according to present novel scheme describe herein.

The embodiments were chosen and described in order to explain the principles and application of the invention, thereby enabling others skilled in the art to utilize the invention in its various embodiments and modifications according to the particular purpose contemplated. The scope of the invention is intended to be defined by the claims appended hereto and their equivalents.

We claim:

1. A computer interface system for using a plurality of independent graphical input devices and for generating a plurality of independent cursors and control points, comprising:
- a user interface;
- a plurality of independent graphical input devices, wherein said graphical input devices are connected to said user interface;
- a plurality of independent device data streams dedicated to each of a plurality of independent graphical input devices, wherein said graphical input devices are connected to said user interface such that they work independently of each other;
- wherein the graphical input devices further comprise means for generating a plurality of independent cursors and control points, such that the said plurality of cursors and control points work independently of each other;
- an operating system interface software, wherein said operating system interface software reads and interprets data from said input devices, said operating system interface software generates request for graphical input devices event message; and
- a graphical input devices driver, wherein said graphical input devices driver decodes input messages from said input devices, said graphical input devices driver generates graphical input devices event message and converts it to data usable for computer operating system or application programs, said graphical input devices driver accepts said request from said operating system interface software for graphical input devices event message, said graphical input devices driver generates said graphical input devices event message and sends it to said operating system interface software.

2. The system in claim 1 further comprising: a plurality of independent graphical cursors and control points, wherein said cursors and control points are generated, respectively, by said graphical input devices driver and by said operating system interface software upon receiving said graphical input devices event message from said graphical input devices driver, positions, movements, and states of said cursors and control points are controlled, respectively, by said graphical input devices driver and by said operating system interface software.

3. The system in claim 1 further comprising:
- a graphical input device aware program, wherein said graphical input device aware program is designed for users to utilize functions of said input devices, said graphical input device aware program interprets data from said graphical input devices driver; and
- a plurality of graphical input device aware objects, wherein said graphical input device aware objects are under control of said graphical input device aware program, said graphical input device aware program sends said graphical input devices event message to said graphical input device aware objects.

4. The system in claim 1, wherein said graphical input devices driver is coupled with an application, said application is adapted to utilize functions of said input devices, application objects or application functionalities within said application are controlled by said graphical input devices driver.

5. A computer interface system for using a plurality of independent graphical input devices and for generating a plurality of independent cursors and control points, comprising:
- a user interface;
- a plurality of independent graphical input devices, wherein said graphical input devices are connected to said user interface;
- a plurality of independent device data streams dedicated to each of a plurality of independent graphical input devices, wherein said graphical input devices are connected to said user interface such that they work independently of each other;
- means for generating a plurality of independent cursors and control points, such that the said plurality of cursors and control points work independently of each other;
- an operating system interface software, wherein said operating system interface software reads and interprets data from said input devices, said operating system interface software generates request for graphical input devices event message;
- a graphical input devices driver, wherein said graphical input devices driver decodes input messages from said input devices, said graphical input devices driver generates graphical input devices event message and converts it to data usable for computer operating system or application programs, said graphical input devices driver accepts said request from said operating system interface software for graphical input devices event message, said graphical input devices driver generates said graphical input devices event message and sends it to said operating system interface software; and
- a plurality of independent graphical cursors and control points, wherein said cursors and control points are generated, respectively, by said graphical input devices driver and by said operating system interface software upon receiving said graphical input devices event message from said graphical input devices driver, positions, movements, and states of said cursors and control points are controlled, respectively, by said graphical input devices driver and by said operating system interface software;
- wherein said graphical input devices driver is coupled with an application, said application is adapted to utilize functions of said input devices, application objects or application functionalities within said application are controlled by said graphical input devices driver.

6. A computer interface system for using a plurality of independent graphical input devices and for generating a plurality of independent cursors and control points, comprising:
- a user interface;
- a plurality of independent graphical input devices, wherein said graphical input devices are connected to said user interface;
- an operating system interface software, wherein said operating system interface software reads and interprets data from said input devices, said operating system interface software generates request for graphical input devices event message;
- a graphical input devices driver, wherein said graphical input devices driver decodes input messages from said input devices, said graphical input devices driver generates graphical input devices event message and converts it to data usable for computer operating system or application programs, said graphical input devices driver accepts said request from said operating system interface software for graphical input devices event message, said graphical input devices driver generates said graphical input devices event message and sends it to said operating system interface software;

a plurality of independent graphical cursors and control points, wherein said cursors and control points are generated, respectively, by said graphical input devices driver and by said operating system interface software upon receiving said graphical input devices event message from said graphical input devices driver;

positions, movements, and states of said cursors and control points are controlled, respectively, by said graphical input devices driver and by said operating system interface software;

a graphical input device aware program, wherein said graphical input device aware program is designed for users to utilize functions of said input devices, said graphical input device aware program interprets data from said graphical input devices driver; and a plurality of graphical input device aware objects, wherein said graphical input device aware objects are under control of said graphical input device aware program, said graphical input device aware program sends said graphical input devices event message to said graphical input device aware objects.

7. A computer interface system for using a plurality of independent graphical input devices and for generating a plurality of independent cursors and control points, comprising:

a user interface;

a plurality of independent graphical input devices, wherein said graphical input devices are connected to said user interface;

a plurality of independent device data streams dedicated to each of a plurality of independent graphical input devices, wherein said graphical input devices are connected to said user interface and work independently of each other;

means for generating a plurality of independent cursors and control points, wherein the said plurality of cursors and control points work independently of each other;

a graphical input devices driver, wherein said graphical input devices driver decodes input messages from said input devices, said graphical input devices driver separates input messages into different subsets according to the sources of said input devices that generates said input messages, for the first subset of said input message, said graphical input devices driver generates graphical input devices event message and converts it to data usable for computer operating system or application programs, said graphical input devices driver also reads in other subsets of said input messages; and an operating system interface software, wherein said operating system interface software reads and interprets data of other subset of said input messages from said graphical input devices driver, said operating system interface software decodes said input messages from said graphical input devices driver, said operating system interface software generates graphical input devices event message and converts it to data usable for computer operating system or application programs;

a graphical input device aware program, wherein said graphical input device aware program is designed for users to utilize functions of said input devices, said graphical input device aware program interprets data, respectively, from said operating system interface software and said graphical input devices driver; and a plurality of graphical input device aware objects, wherein said graphical input device aware objects are under control of said graphical input device aware program, said graphical input device aware program sends said graphical input devices event message to said graphical input device aware objects.

8. The system in claim 7 further comprising:

a plurality of independent graphical cursors and control points, wherein said cursors and control points are generated, respectively according to different said input devices, by said operating system interface software and said graphical input devices driver, positions, movements, and states of said cursors and control points are controlled, respectively, by said operating system interface software and said graphical input devices driver.

9. The system in claim 7, wherein said graphical input devices driver or said operating system interface software is coupled with an application, said application is adapted to utilize functions of said input devices, application objects or application functionalities within said application are controlled by said graphical input devices driver or said operating system interface software.

10. A computer interface system for using a plurality of independent graphical input devices and for generating a plurality of independent cursors and control points, comprising:

a user interface;

a plurality of independent graphical input devices, wherein said graphical input devices are connected to said user interface;

a graphical input devices driver, wherein said graphical input devices driver decodes input messages from said input devices, said graphical input devices driver separates input messages into different subsets according to the sources of said input devices that generates said input messages, for the first subset of said input message, said graphical input devices driver generates graphical input devices event message and converts it to data usable for computer operating system or application programs, said graphical input devices driver also reads in other subsets of said input messages;

an operating system interface software, wherein said operating system interface software reads and interprets data of other subset of said input messages from said graphical input devices driver, said operating system interface software decodes said input messages from said graphical input devices driver, said operating system interface software generates graphical input devices event message and converts it to data usable for computer operating system or application programs; and a plurality of independent graphical cursors and control points, wherein said cursors and control points are generated, respectively according to different said input devices, by said operating system interface software and said graphical input devices driver;

positions, movements, and states of said cursors and control points are controlled, respectively, by said operating system interface software and said graphical input devices driver;

wherein said graphical input devices driver or said operating system interface software is coupled with an application, said application is adapted to utilize functions of said input devices, application objects or application functionalities within said application are controlled by said graphical input devices driver or said operating system interface software.

11. A computer interface system for using a plurality of independent graphical input devices and for generating a plurality of independent cursors and control points, comprising: a user interface; a plurality of independent graphical input devices, wherein said graphical input devices are connected to said user interface;
- a graphical input devices driver, wherein said graphical input devices driver decodes input messages from said input devices, said graphical input devices driver separates input messages into different subsets according to the sources of said input devices that generates said input messages, for the first subset of said input message, said graphical input devices driver generates graphical input devices event message and converts it to data usable for computer operating system or application programs, said graphical input devices driver also reads in other subsets of said input messages;
- an operating system interface software, wherein said operating system interface software reads and interprets data of other subset of said input messages from said graphical input devices driver, said operating system interface software decodes said input messages from said graphical input devices driver, said operating system interface software generates graphical input devices event message and converts it to data usable for computer operating system or application programs;
- a plurality of independent graphical cursors and control points, wherein said cursors and control points are generated, respectively according to different said input devices, by said operating system interface software and said graphical input devices driver;
- positions, movements, and states of said cursors and control points are controlled, respectively, by said operating system interface software and said graphical input devices driver;
- a graphical input device aware program, wherein said graphical input device aware program is designed for users to utilize functions of said input devices, said graphical input device aware program interprets data, respectively, from said operating system interface software and said graphical input devices driver; and a plurality of graphical input device aware objects, wherein said graphical input device aware objects are under control of said graphical input device aware program, said graphical input device aware program sends said graphical input devices event message to said graphical input device aware objects.

12. A computer interface system for using a plurality of independent graphical input devices and for generating a plurality of independent cursors and control points, comprising:
- a user interface;
- a plurality of independent graphical input devices, wherein said graphical input devices are connected to said user interface;
- an operating system interface software, wherein said operating system interface software reads and interprets data from said input devices, said operating system interface software recognizes and separates the input message into different subsets according to different sources of said input devices, said operating system interface software decodes said input messages from said input devices for each said subset, said operating system interface software generates graphical input devices event message for each said subset and converts it to data usable for computer operating system or application programs;
- a plurality of independent graphical cursors and control points, wherein said cursors and control points are generated by said operating system interface software, each of said cursors and control points are generated independently and corresponds to each said input devices;
- positions, movements, and states of said cursors and control points are controlled by said operating system interface software; a graphical input device aware program, wherein said graphical input device aware program is designed for users to utilize functions of said input devices, said graphical input device aware program interprets data from said operating system interface software; and
- a plurality of graphical input device aware objects, wherein said graphical input device aware objects are under control of said graphical input device aware program, said graphical input device aware program sends said graphical input devices event message to said graphical input device aware objects.

* * * * *